(12) United States Patent
Soni

(10) Patent No.: US 6,686,774 B1
(45) Date of Patent: Feb. 3, 2004

(54) SYSTEM AND METHOD FOR A HIGH SPEED, BI-DIRECTIONAL, ZERO TURNAROUND TIME, PSEUDO DIFFERENTIAL BUS CAPABLE OF SUPPORTING ARBITRARY NUMBER OF DRIVERS AND RECEIVERS

(75) Inventor: Tejvansh Singh Soni, Fremont, CA (US)

(73) Assignee: Raza Microelectronics, Inc., San Jose, CA (US)

( * ) Notice: Subject to any disclaimer, the term of this patent is extended or adjusted under 35 U.S.C. 154(b) by 0 days.

(21) Appl. No.: 09/909,316

(22) Filed: Jul. 19, 2001

(51) Int. Cl.[7] .............................................. H03K 19/094
(52) U.S. Cl. ............................ 326/86; 326/95; 326/98; 326/32; 326/21
(58) Field of Search ................................ 326/21, 30, 86, 326/90, 93, 95, 96, 98; 327/208–212, 214, 215, 224, 225

(56) References Cited

U.S. PATENT DOCUMENTS

| | | | | |
|---|---|---|---|---|
| 5,818,261 A | * | 10/1998 | Perner | 326/86 |
| 6,014,040 A | * | 1/2000 | Tracy | 326/90 |
| 6,144,218 A | * | 11/2000 | Smith et al. | 326/32 |
| 6,150,846 A | * | 11/2000 | Sakamoto | 326/86 |
| 6,222,388 B1 | * | 4/2001 | Bridgewater, Jr. | 326/86 |
| 6,316,957 B1 | * | 11/2001 | Ang et al. | 326/30 |
| 6,337,581 B1 | * | 1/2002 | Kanetani et al. | 326/83 |

* cited by examiner

Primary Examiner—Vibol Tan
(74) Attorney, Agent, or Firm—Fernandez & Assoc., LLP

(57) ABSTRACT

A method and system for high speed bussing in microprocessors and microelectronic devices is disclosed. The method and system implement a type of differential bus with distributed bus pre-charge units designed to decrease bus pre-charge time. The method and system utilize a universal self-tracking clock signal to determine the minimum required bus pre-charge time. The time saved by decreasing the bus pre-charge time can be directly applied to the bus evaluation period thereby increasing system performance and reliability.

5 Claims, 3 Drawing Sheets

SYSTEM AND METHOD FOR A HIGH SPEED, BI-DIRECTIONAL, ZERO TURNAROUND TIME, PSEUDO DIFFERENTIAL BUS CAPABLE OF SUPPORTING ARBITRARY NUMBER OF DRIVERS AND RECEIVERS

FIELD OF INVENTION

The invention relates generally to computer architecture and microprocessor design, and more specifically to bussing and bussing methods used to transfer data from one point to another.

BACKGROUND OF INVENTION

The transfer of data from one point to another is a vital function of all computers and microprocessors. The structure by which data is transferred is known as a bus, and the method by which the data is transferred on the bus is known as the bussing scheme or bussing method.

There are many different types of busses and bussing schemes. Since the transfer of data is critical in processor performance, high-speed bussing has become vital. Unfortunately, high-speed bussing becomes very difficult as busses grow in length to accommodate larger and larger chip sizes, while the physical width of the bus becomes narrower to allow more devices to be placed on a unit of silicon. Longer busses result in increased data propagation delay across the bus due to increased RC (Resistance-Capacitance) loading on the bus.

One popular bussing scheme to overcome the difficulties of longer bus lengths is the differential bus scheme. A differential bus requires a true data signal and a complement data signal to complete a data transfer. The receiver in a differential bus design reacts to the voltage difference between the true and complementary bit lines. Reduced data transfer times in a differential bus design result primarily from the limited voltage swings needed on the true and differential bit lines. Typical differentials required for reliable operation of the differential bus range from 100 mV to 300 mV. Before a transfer of data across the differential bus, both lines are pre-charged, or biased, to some level above ground, typically Vdd/2, where Vdd is the power supply voltage in the design. As data is driven onto the bus, one of the bit line's potential is pulled towards Vdd and the other bit line's potential is discharged towards ground. For example if the power supply voltage is 3V, the bias level on the differential bit lines will be 1.5V. If the data transitions from ground to Vdd (3V in this example), the potential on the true bit line increases to 2.0V and the potential on the complementary bit line decreases to 1.0V, thereby resulting in a voltage differential of 1V.

While this differential bussing scheme works well, there are still some drawbacks. It requires special biasing circuitry. For CMOS implementations, biasing at a level other than ground or Vdd results in static power dissipation. Biasing at a level between ground and Vdd may require an additional reference power supply and may require an additional clock cycle, thereby adding to the latency of the data transfer which also means reduced bandwidth on the bus.

Accordingly, there is a need to design a faster bussing scheme.

SUMMARY OF INVENTION

The present invention discloses a processor having a differential bus, comprising: a differential bus; and a clock line carrying a clock signal that determines a pre-charge time of the differential bus. The differential signals are pre-charged by distributed devices to Vdd at every transmitter location along the bus. This reduces the pre-charge time on the heavily loaded busses, thereby apportioning a larger amount of the clock cycle time towards evaluation, i.e. the development of a voltage differential on the true and complement bits of the bus. A self-tracking clock is used to generate the pre-charge and evaluation phases from a standard clock.

Advantageously, the present invention provides the following advantages: ensures complete pre-charge to Vdd for the differential bit lines, across process, voltage and temperature variations, allocates sufficient pre-charge time that is needed to complete the pre-charge operation, thereby maximizing the evaluation time. In addition, the differential bit lines are pre-charged to Vdd, thereby eliminating the need to have special biasing circuitry, preventing any static power dissipation in this design. The pre-charge scheme further provides distributed pre-charge devices and a self-tracking clock to regulate the pre-charge time and does not add to the latency of the differential bus, thereby permitting back-to-back accesses on the bus, resulting in higher data transfer bandwidth.

DETAILED DESCRIPTION OF PREFERRED EMBODIMENTS(s)

Bus Architecture

The invention here described is intended primarily for use in high-speed bussing for microprocessors and microelectronic devices.

A typical differential bussing architecture contains two bus lines, the first bus line called the true bus and carrying the true data, and the second bus line called the complement bus and carrying the complement of the data. The present invention utilizes the differential bus lines in a uniquemanner to eliminate DC power dissipation and to reduce the pre-charge overhead by deploying a distributed pre-charge scheme in conjunction with a self-tracking signal which divides the clock cycle time into optimal pre-charge and evaluation phases. Therefore, the pre-charge scheme does not add to the latency of the data transfer on the bus.

Figure 1:
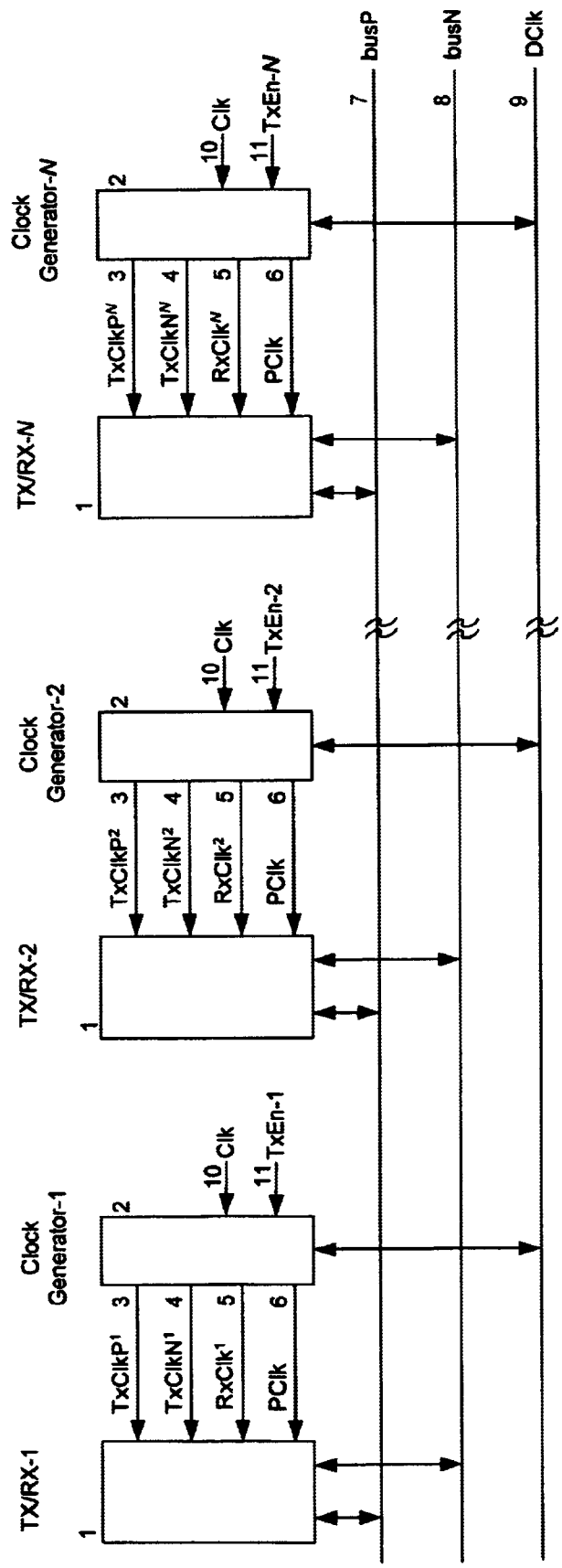
FIG. 1 is general system block diagram of a pseudo differential bus scheme in accordance with the present invention.

FIG. 1 illustrates a block diagram of a pseudo differential bus scheme. Given a typical differential bus, with true bus lines, herein called busP 7, and complement bus lines, herein called busN 8, one embodiment of the invention places an additional transmission line in parallel with the bus lines, the additional transmission line carrying a self-tracking clock signal, herein called the DClk 9. Along the length of the bus is placed one or more transceiver units, each with the ability to drive data onto the bus during the evaluation phase and pre-charge the bus lines during the pre-charge phase. These distributed transceiver units, herein called TX/RX-N 1, where N denotes a unique value associated with each unique transceiver unit, take as input: the true bus 7, the complement bus 8, the DClk 9, a transmit clock signal, herein called TxClkP$^N$ 3, a second transmit clock signal, herein called TxClkN$^N$ 4, a receive clock signal, herein called RxClk$^N$ 5, a pre-charge clock signal, herein called PClk 6. Throughout this document where N appears in superscript at the end of a signal name it denotes a unique identifier that is associated with the unique transceiver unit that takes the signal as input (i.e. transceiver TX/RX-1 takes signal TxClkP$^1$ as input). Each signal name with a unique identifier denotes a unique signal.

At locations proximal to each of the distributed transceiver units is a clock generation unit 2. Each clock generation unit takes as input a universal chip clock signal, herein called Clk 10, and a transmit enable signal, herein called TxEn-N 11, where N is denotes a unique value associated with each unique clock generation unit 2 (i.e. Clock Generation Unit 1 takes as input TxEn-1). The clock generation unit outputs: TxClkP$^N$ 3, TXClkN$^N$ 4, RxClk$^N$ 5, PClk 6, DClk 9.

The description of the transceiver units and clock generation units is for demonstration purposes only and in no way limits the scope of the claims.

The key to the present invention is the DClk 9. The DClk 9 is a self-tracking clock signal that is generated to partition the pre-charge phase and the evaluation phase of the bussing process. By adjusting to compensate for varying bus load, voltage, and temperature, the DClk 9 guarantees a complete pre-charge of the bus while minimizing the time spent pre-charging the bus.

For the DClk 9 to operate properly, certain conditions are to be met. First, the DClk 9 routing should match the worst case routing of any bit on the differential bus, thereby ensuring similar RC (resistive and capacitive) loading on DClk 9 and the most heavily loaded bit on the differential bus. This will ensure coherence of the data and DClk 9 signals. Second, since the pre-charge of the bus is distributed, DClk 9 also has a distributed pre-charge similar to that of the data bus, equal in number and location of pre-charge devices on the data bus. Again, this will ensure coherence of the data and DClk 9 signals. Third, the DClk 9 has a full rail-to-rail swing. The full rail-to-rail swing forces the clock bus to charge and discharge to the fullest extent, thereby matching the worst-case pre-charge time. Although this third condition is not absolutely necessary, it is recommended and will increase the reliability of the design by providing a small "time cushion" for the pre-charge of the bus.

The routing of the DClk 9, as well as the distributed pre-charge of the DClk 9, can be accomplished by adding control of the DClk 9 to the distributed clock generation units 2. Since the clock generation units 2 and data transceiver units 1 are similarly located along the bus, this in effect binds the data bus and the DClk 9 to the same routing and same pre-charge distribution. The full rail-to-rail swing of the DClk 9 can be accomplished by adding pull down devices at locations similar to the pre-charge devices of the DClk 9.

Bussing Scheme

The faster data transmission times achieved by this bussing technique are due primarily to the decrease in bus pre-charge time. The pre-charge time is determined by the pre-charge clock, herein called the PClk 6.

Figure 3:
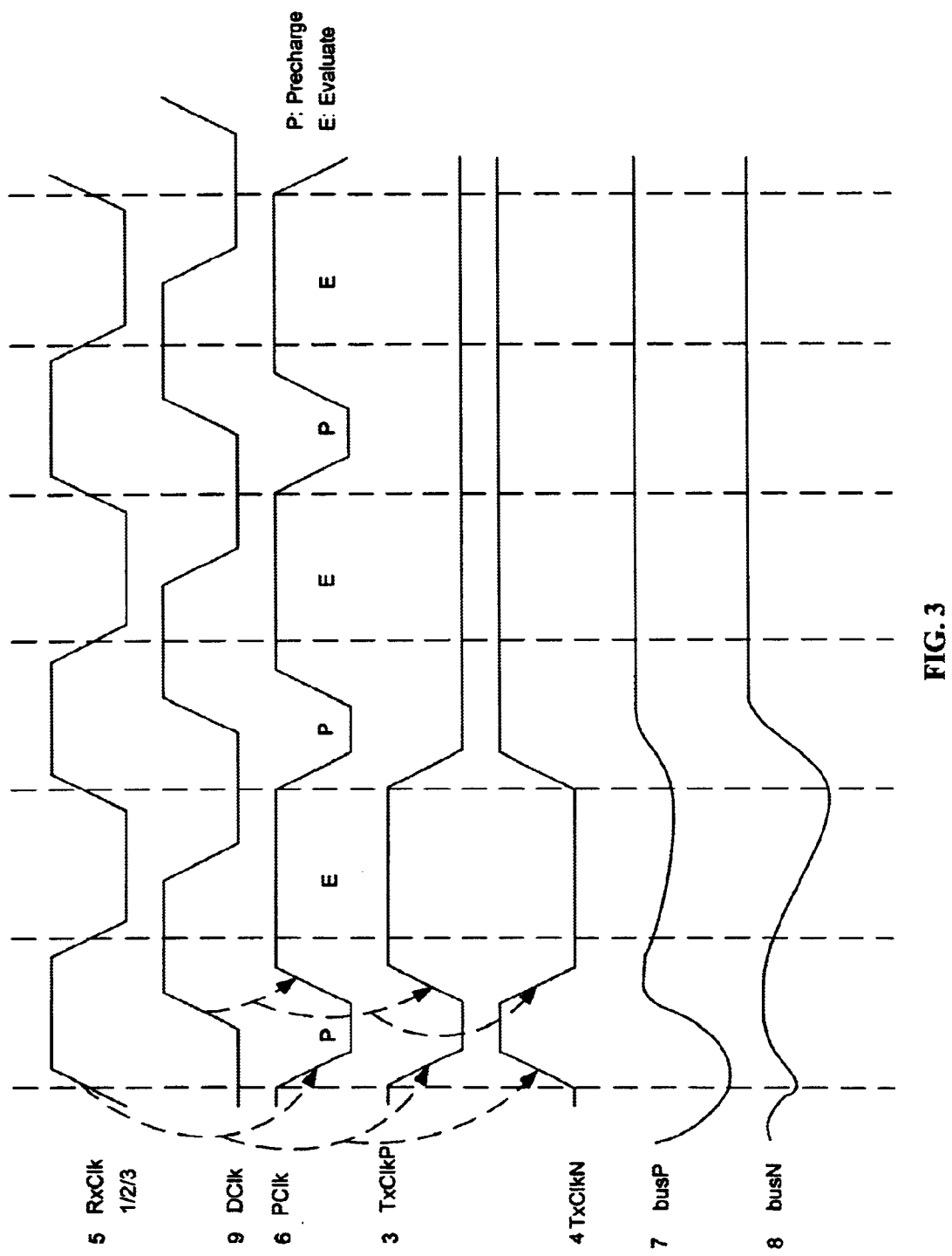
FIG. 3 is a timing diagram detailing the signal sequence for bus operation in accordance with the present invention.

FIG. 3 depicts the signals and signal transitions that enable high speed bussing with minimal pre-charge time. When the PClk 6 is low, the bus is pre-charging, and when the PClk 6 is high, the bus data can be evaluated. While the PClk 6 is low, it is herein called the pre-charge phase of the clock cycle. While the PClk 6 is high, it is herein called the evaluation phase of the clock cycle. It is the nature of this signal that by minimizing the pre-charge time, the evaluation time is maximized. Therefore, it is desirable to minimize the time the PClk 6 is low, while still allowing enough time for the bus to pre-charge properly.

The PClk 6 is controlled by the DClk 9, while the DClk 9 is, in turn, controlled by the RxClk 5. The RxClk 5 is derived from the chip clock, Clk 10. As the RxClk 5 transitions from low to high, it triggers the DClk 9 to transition from low to high, and the PClk 6 to transition from high to low. The transition of the PClk 6 from high to low in turn triggers the distributed units to begin the pre-charge of the bus. The transition of the DClk 9 from low to high triggers the PClk 6 to transition from low to high which in turn turns off the pre-charge on the differential bus. Since the DClk 9 is routed for worst case data routing and must make a full rail-to-rail swing, the time required for a low to high transition on the DClk 9, which has the worst case RC loading of the differential bus, represents the worst case pre-charge time required for the differential bus. This delay will ensure that the PClk 6 stays low long enough to pre-charge the differential bus before making the transition back to the asserted state, while at the same time ensuring that the pre-charge phase takes no more time than that which is necessary.

When the PClk 6 is high (in the asserted state), data can be written to the bus. If the transmit enable, herein called TxEn-N 11, is asserted then the transition of PClk 6 from low to high triggers transceiver unit TX/RX-N 1 to drive data onto the bus, where N denotes a unique identifier associated with a unique transceiver unit.

The RxClk 5 transitions from high to low, triggering the DClk 9 to transition from high to low. As the RxClk 5 transitions from low to high, this transition triggers the capture of data from the bus before the process repeats and the PClk 6 goes low once again. Thus for every cycle of RxClk 5, data can be transmitted and received on the bus, giving this bussing scheme a zero-turnaround time.

There are several advantages to this bussing scheme. The distributed pre-charge helps to reduce the time required to pre-charge the bus, thus allowing for greater evaluation time. Since each transceiver is associated with a pre-charge device, this bussing scheme can support an arbitrary number of transmitters and receivers without affecting the performance of the bus. By pre-charging the bus to supply voltage, there is no DC power dissipation associated with biasing the bus, and there is no need for specialized biasing circuitry. In addition, since the DClk is self-tracking, the timing for this bussing scheme is stable across process, voltage, and temperature variations, and is completely scalable, allowing for longer busses and higher frequencies.

Figure 2:
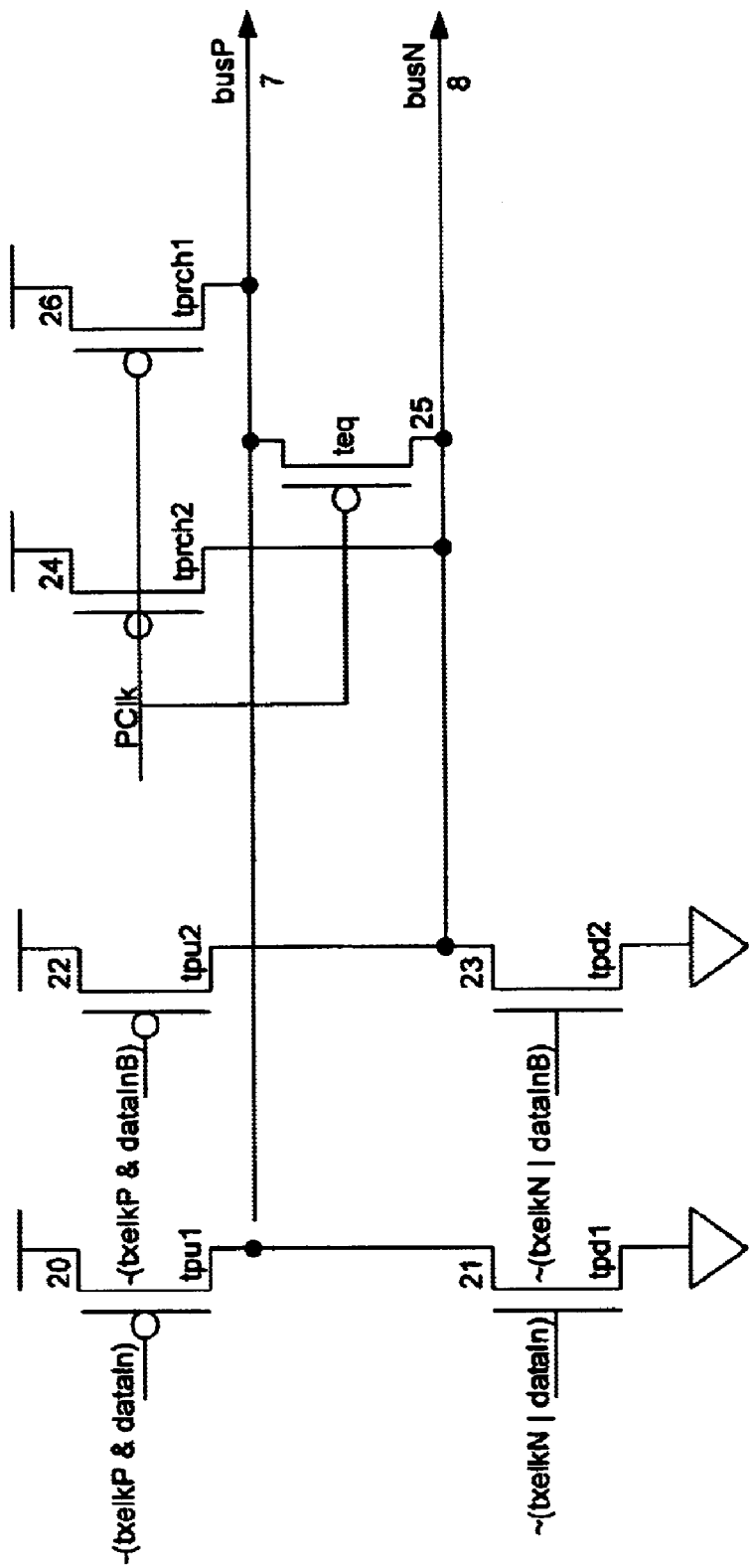
FIG. 2 is a detailed transistor level diagram of the bus pre-charge devices and a transmitter in accordance with the present invention.

FIG. 2 shows one possible implementation of a Transmitter Unit with pre-charge circuitry. As RxClk 5 transitions from low to high, TxClkP 3 and TxClkN 4 are triggered for transition. TxClkP 3 transitions from high to low, turning off the PMOS transistor tpu 1 20. TxClkN 4 transitions from low to high, turning off the NMOS tpd 1 21. With both tpu 1 20 and tpd 1 21 turned off, busP 7 is tri-stated at the transmitter. Similarly, tpu2 22 and tpd2 23 are turned off, tri-stating busN 8. Since PClk 6 is low, tprch2 24 is in a conductive state, pulling up busN 8 to supply voltage. Similarly, since PClk is low, tprch1 26 is in a conductive state, pulling up busP 7 to supply voltage. In addition, since PClk is low, teq 25 is in a conductive state, creating a conductive channel between busP 7 and busN 8, which in turn ensures equal potential on both data bus lines.

As PClk transitions from low to high, tprch2 24, tprch1 26, and teq 25 change to a non-conductive state, isolating busP 7 and busN 8 from the power supply and from each other. The transition of PClk from low to high causes TxClkP 3 to transition from low to high, and TxClkN 4 to transition from high to low, if TxEn 11 is asserted. With TxClkP 3 asserted and TxClkN 4 unasserted, the dataIn signal is able to influence the state of the differential bus lines busP 7 and busN 8.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A system having a differential bus, comprising:
    a differential bus wherein the differential bus comprises at least one data line; and
    a clock line carrying a clock signal that determines a pre-charge time of the differential bus;
    wherein the at least one data line having a first set of parameters including a first voltage and a first temperature, wherein the clock line having a second set of parameters including a second voltage and a second temperature.

2. The system of claim 1, wherein the second voltage is equal or substantially equal to the first voltage, and wherein the second temperature is equal or substantially equal to the first temperature.

3. A method for operating a differential bus, comprising:
    generating a data clock signal having a self-tracking mechanism that is dependent on fabrication process, voltage and temperature variations; and
    responding to the data clock signal, generating a pre-charge clock having a variable pre-charge time.

4. The method of claim 3, further comprising, responding to an assertion of the data clock signal, generating a transmit clock signal for a positive bus line.

5. The method of claim 3, further comprising, responding to an assertion of the data clock signal, generating a transmit clock signal for a negative bus line.

* * * * *